US009373448B2

(12) United States Patent
Majima et al.

(10) Patent No.: US 9,373,448 B2
(45) Date of Patent: Jun. 21, 2016

(54) METHOD OF MANUFACTURING ELECTROLYTIC CAPACITOR

(75) Inventors: Ryo Majima, Osaka (JP); Hitoshi Ishimoto, Hyogo (JP); Tatsuji Aoyama, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 13/696,343

(22) PCT Filed: Mar. 7, 2012

(86) PCT No.: PCT/JP2012/001543
§ 371 (c)(1),
(2), (4) Date: Nov. 6, 2012

(87) PCT Pub. No.: WO2012/132248
PCT Pub. Date: Oct. 4, 2012

(65) Prior Publication Data
US 2013/0059064 A1 Mar. 7, 2013

(30) Foreign Application Priority Data

Mar. 25, 2011 (JP) .................................. 2011-067233

(51) Int. Cl.
*H01G 9/00* (2006.01)
*H01G 9/028* (2006.01)
(Continued)

(52) U.S. Cl.
CPC .............. *H01G 9/028* (2013.01); *H01G 9/0029* (2013.01); *H01G 9/0036* (2013.01); *H01G 11/48* (2013.01); *H01G 11/52* (2013.01); *H01G 11/56* (2013.01); *Y02E 60/13* (2013.01); *Y02T 10/7022* (2013.01)

(58) Field of Classification Search
USPC ......... 361/503, 523, 528, 502, 500; 29/25.03; 257/303, 532, 259; 427/80, 79; 438/239
See application file for complete search history.

(56) References Cited

U.S. PATENT DOCUMENTS

2003/0058605 A1* 3/2003 Keser ............................. 361/508
2003/0133256 A1* 7/2003 Yoshida et al. ................ 361/523
(Continued)

FOREIGN PATENT DOCUMENTS

CN 101263568 A 9/2008
EP 2 330 605 6/2011
(Continued)

OTHER PUBLICATIONS

International Search Report issued Jun. 12, 2012 in International (PCT) Application No. PCT/JP2012/001543.
(Continued)

*Primary Examiner* — Michael Cleveland
*Assistant Examiner* — Tabassom Tadayyon Eslami
(74) *Attorney, Agent, or Firm* — Wenderoth, Lind & Ponack, L.L.P.

(57) ABSTRACT

A method of manufacturing an electrolytic capacitor includes preparing a dielectric film formed on a surface of an anode foil, forming a first conductive polymer layer on a surface of the dielectric film by immersing the anode foil in first dispersion solution including conductive polymer particles and forming a second conductive polymer layer covering the first conductive polymer layer solvent by immersing the anode foil in second dispersion solution including second conductive polymer particles and second solvent. The surface of the anode foil has plural pits formed therein. The second dispersion solution has a pH value farther from 7 than the first dispersion solution does. This configuration can suppress damages to the dielectric film.

13 Claims, 4 Drawing Sheets

(51) Int. Cl.
*H01G 11/48* (2013.01)
*H01G 11/52* (2013.01)
*H01G 11/56* (2013.01)

(56) References Cited

U.S. PATENT DOCUMENTS

| | | | |
|---|---|---|---|
| 2007/0064376 A1* | 3/2007 | Merker et al. | 361/528 |
| 2008/0005878 A1 | 1/2008 | Merker et al. | |
| 2009/0021893 A1 | 1/2009 | Kakuma et al. | |
| 2009/0109603 A1* | 4/2009 | Nobuta et al. | 361/528 |
| 2009/0268378 A1 | 10/2009 | Matsuura et al. | |
| 2011/0171366 A1* | 7/2011 | Ning | H01G 9/0036 427/80 |
| 2012/0075772 A1 | 3/2012 | Merker et al. | |

FOREIGN PATENT DOCUMENTS

| | | |
|---|---|---|
| JP | 2006-287182 | 10/2006 |
| JP | 2009-11105 | 1/2009 |
| JP | 2009-016770 | 1/2009 |
| JP | 2009-266926 | 11/2009 |
| JP | 2010-087401 | 4/2010 |

OTHER PUBLICATIONS

Written Opinion of the International Searching Authority issued Jun. 12, 2012, in PCT PCT/JP2012/001543 (with English translation).
English translation of Chinese Office Action issued Mar. 6, 2014 in corresponding Chinese Application No. 2012800018644.

* cited by examiner

| | pH | | Characteristics of Capacitor | | |
|---|---|---|---|---|---|
| | First Dispersion Solution | Second Dispersion Solution | Capacitance | ESR | Leakage Current |
| Reference Sample | 7 | 7 | 100 | 100 | 100 |
| Example 1 | 7 | 4 | 110 | 80 | 100 |
| Comparative Example 1 | 4 | 7 | 108 | 85 | 155 |
| Comparative Example 2 | 4 | 4 | 112 | 78 | 215 |

Fig. 4

METHOD OF MANUFACTURING ELECTROLYTIC CAPACITOR

This application is a U.S. national stage application of the PCT international application No. PCT/W2012/001543, filed Mar. 7, 2012.

TECHNICAL FIELD

The present invention relates to a method of manufacturing an electrolytic capacitor that is used in various electronic devices, electric devices, industrial devices, and automobile devices.

BACKGROUND ART

With the advent of electronic devices having a high frequency, a capacitor, an electronic component, also has been required to have a large capacitance and a superior impedance characteristic in a high frequency region. Recently, in order to reduce the impedance in this high frequency region, an electrolytic capacitor using conductive polymer having a high electrical conductivity has been commercialized.

An electrolytic capacitor includes an anode foil a dielectric film formed on a surface of the anode foil and a conductive polymer layer formed on the dielectric film. The surface of the anode foil is roughened to have pits formed therein.

The conductive polymer layer may be formed by, for example, in addition to chemical polymerization or electropolymerization, a dispersion method by which conductive polymer particles are impregnated in a capacitor element. Chemical polymerization may damage the dielectric film due to oxidizing agent. Chemical polymerization or electropolymerization can hardly form a conductive polymer layer uniformly, thus providing the conductive polymer layer with a large thickness with a large amount of conductive polymer.

Patent Literatures 1 and 2 are known as prior art publications related to the present invention.

CITATION LIST

Patent Literature

Patent Literature 1: Japanese Patent Laid-Open Publication No.2009-266926
Patent Literature 2: Japanese Patent Laid-Open Publication No.2009-16770

SUMMARY OF THE INVENTION

A method of manufacturing an electrolytic capacitor includes: preparing an anode foil having a surface having plural pits provided therein and a dielectric film formed on the surface of the anode foil, immersing the anode foil in a first dispersion solution containing first conductive polymer particles and first solvent to form a first conductive polymer layer on the surface of the dielectric film, and immersing the anode foil in a second dispersion solution to form a second conductive polymer layer covering the first conductive polymer layer. The second dispersion solution contains second conductive polymer particles and second solvent and has a pH value different from 7 from the first dispersion solution.

DETAIL DESCRIPTION OF PREFERRED EMBODIMENT

Figure 1:
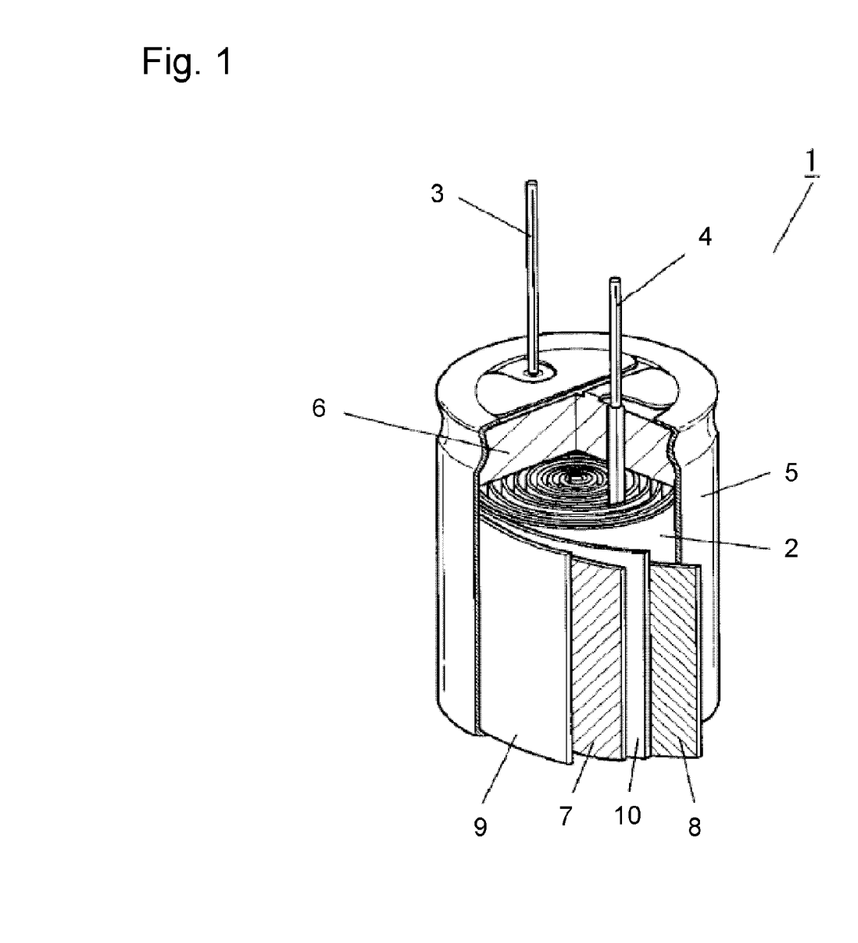
FIG. 1 is a partially cutaway perspective view of an electrolytic capacitor in accordance with an exemplary embodiment of the present invention.

FIG. 1 is a partially cutaway perspective view of electrolytic capacitor 1 in accordance with an exemplary embodiment. Electrolytic capacitor 1 has a diameter of 6.3 mm and a height of 5.8 mm, but may have other sizes. According to the embodiment, electrolytic capacitor 1 is a roll type capacitor but may be a laminated type capacitor obtained by stacking plural capacitor elements having a flat plate shape.

The electrolytic capacitor includes capacitor element 2, anode terminal 3 connected to capacitor element 2, cathode terminal 4 connected to capacitor element 2, case 5 for accommodating capacitor element 2 therein, and sealing member 6 for sealing an opening of case 5.

Capacitor element 2 includes anode foil 7, cathode foil 8, and separators 9 and 10 provided between anode foil 7 and cathode foil 8. Anode foil 7, cathode foil 8, and separators 9 and 10 are rolled unitarily.

Anode terminal 3 is connected to anode foil 7. Cathode terminal 4 is connected to cathode foil 8. Tip ends of anode terminal 3 and cathode terminal 4 pass through sealing member 6 and are exposed to an outside of the case.

An inside of case 5 may be filled with an electrolyte solution together with capacitor element 2

In electrolytic capacitor 1 according to the embodiment, anode foil 7 has a thickness of about 100 μm and is an aluminum foil having a purity of aluminum not less than 99.99%. Anode foil 7 may be made of valve metal, such as titanium, other than aluminum.

Figure 2:
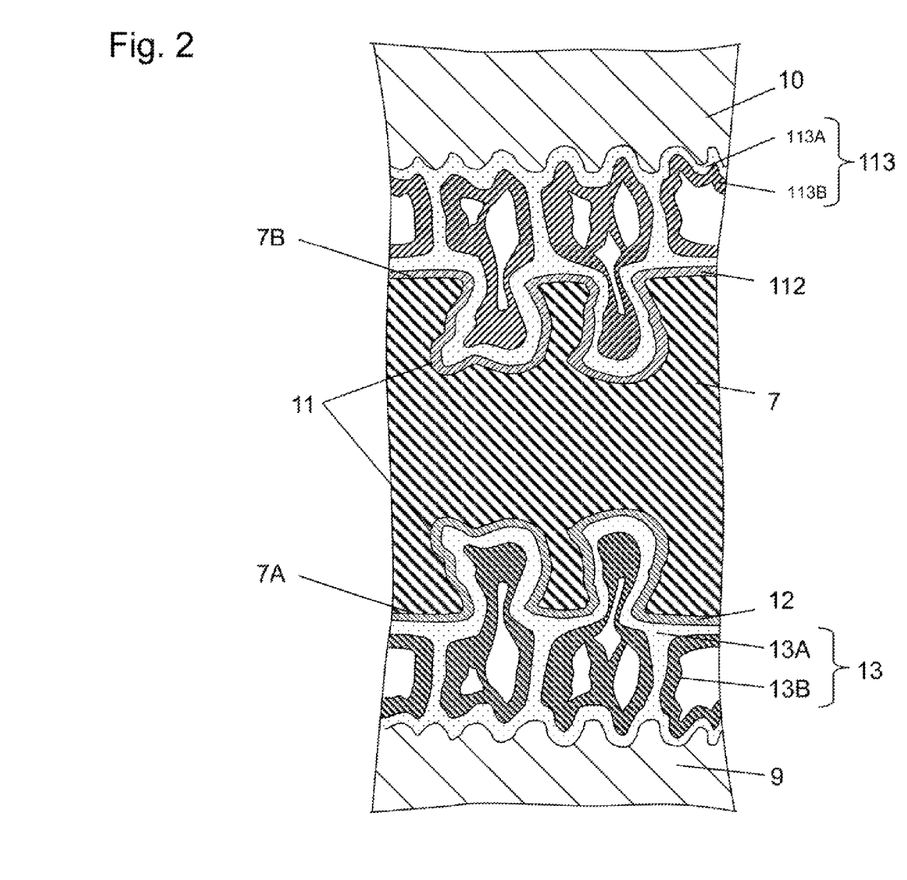
FIG. 2 is a schematic cross-sectional view of a capacitor element of the electrolytic capacitor in accordance with the embodiment.

FIG. 2 is a schematic cross-sectional view of capacitor element 2. Anode foil 7 has surfaces 7A and 7B that are roughened by etching or vapor deposition to have pits 11 therein. Pits 11 have pit diameters having mode value d that is not smaller than about 100 nm and not larger than about 300 nm. The pit diameter distribution can be measured based on the mercury intrusion technique.

Anode foil 7 has surfaces 7A and 7B having dielectric films 12 and 112 formed thereon, respectively. Dielectric films 12 and 112 have surfaces having conductive polymer layers 13 and 113 formed thereon, respectively. Conductive polymer layer 13 is also formed on a surface of separator 9 to partially or entirely fill a space between dielectric film 12 and separator 9. Conductive polymer layer 113 is also formed on a surface of separator 10 to partially or entirely fill a space between dielectric film 112 and separator 10.

Conductive polymer layers 13 and 113 include first conductive polymer layers 13A and 113A formed on the surfaces of dielectric films 12 and 112 and separators 9 and 10; and second conductive polymer layers 13B and 113B formed on first conductive polymer layers 13A and 113A, respectively. One or plural conductive polymer layer(s) may be further formed between first conductive polymer layer 13A and second conductive polymer layer 13B and between first conductive polymer layer 113A and second conductive polymer layer 113B. Thus, second conductive polymer layers 13B and 113B cover first conductive polymer layers 13A and 113A and may not contact first conductive polymer layers 13A and 113A, respectively. First conductive polymer layers 13A and 113A partially or entirely cover inner walls of pits 11. First conductive polymer layers 13A and 113A partially or entirely cover the surfaces of separators 9 and 10.

Conductive polymer layers 13 and 113 can be formed by dispersion solution. The dispersion solution includes solvent and conductive polymer particles consisting of π-conjugated organic polymer.

The π-conjugated organic polymer may be, e.g. polypyrrole-based, polythiophene-based, and polyaniline-based. The polypyrrole-based organic polymer may be, e.g. poly(3-methylpyrrole) or poly(3-ethylpyrrole). The polythiophene-based organic polymer may be, e.g. polythiophene, poly(3-methylthiophene), poly(3,4-dimethylthiophene) or poly(3, 4ethylenedioxythiophene). Polyaniline-based organic polymer may be, e.g. poly(2-methylaniline) or poly(3-aniline-sulfonic acid).

The above conductive polymer may include dopant of compound having, e.g. an alkyl group, carboxy group, sulfo group, alkoxy group, hydroxy group, or cyano group. The dopant can improve the electrical conductivity of the conductive polymer.

The solvent may be water or various organic solvents.

Similarly to anode foil 7, cathode foil 8 can be made of valve metal, such as aluminum or titanium. Separators 9 and 10 may be made of, e.g. cellulose, polyethylene terephthalate or aramid.

The electrolyte solution put into case 5 may be obtained, for example, by dissolving organic acid or salt thereof or inorganic acid or salt thereof as electrolyte in a solvent of γ-butyrolactone, sulfolane, ethylene glycol, or mixture thereof.

A method of manufacturing the electrolytic capacitor according to the embodiment will be described.

First, a surface of a valve metal foil, such as an aluminum foil, to be used as anode foil 7 is roughened by etching or vapor deposition to form a lot of pits 11 in the surface.

Then, the valve metal foil is anodized to form dielectric films 12 and 112 on the surfaces thereof. Similarly to anode foil 7, cathode foil 8 may be prepared by anodizing a valve metal foil form an oxide film on the surface. After the anodizing, the valve metal foil is cleaned and dried.

Next, the valve metal foils to be used as anode foil 7 and cathode foil 8 are cut to have predetermined size. Then, the resultant cut foils are connected to anode terminal 3 and cathode terminal 4 by, e.g. a caulking processing or a laser welding for example.

Then, anode foil 7 and cathode foil 8 are rolled with separators 9 and 10 disposed between anode foil 7 and cathode foil 8 thereby providing capacitor element 2.

Next, rolled capacitor element 2 is re-anodized to correct damages to dielectric film 12 caused by the rolling, thereby correcting lost parts of dielectric films 12 and 112. The re-anodizing also forms oxide films on anode terminal 3 and cathode terminal 4.

After the re-anodizing, capacitor element 2 is immersed in the first dispersion solution for a predetermined duration. The first dispersion solution includes the conductive polymer particles and the solvent. Hereinafter, the conductive polymer included in the first dispersion solution will be called first conductive polymer while the solvent included in the first dispersion solution will be called first solvent. Separators 9 and 10 absorb the first dispersion solution due to a capillary action to allow separators 9 and 10 to retain the first conductive polymer particles. Then, capacitor element 2 is dried to dry the first solvent. After the drying, first conductive polymer layers 13A and 113A are formed on the surfaces of separators 9 and 10 and the surfaces of dielectric films 12 and 112.

Next, capacitor element 2 is immersed in the second dispersion solution and is dried. The second dispersion solution also includes the conductive polymer particles and solvent. Hereinafter, conductive polymer included in the second dispersion solution will be called second conductive polymer while the solvent included in the second dispersion solution will be called second solvent. Then, second conductive polymer layers 13B and 113B are formed on first conductive polymer layers 13A and 113A.

The second dispersion solution is more highly acidic or basic than the first dispersion solution, and has a pH value farther from 7 than the first dispersion solution does. The pH values of the first dispersion solution and the second dispersion solution can be adjusted by adding acidic substance or basic substance or by removing anion or cation from the first dispersion solution and the second dispersion solution.

In the case that other conductive polymer layers are formed between first conductive polymer layer 13A and second conductive polymer layer 13B and between first conductive polymer layer 113A and second conductive polymer layer 113B, another immersing of capacitor element 2 in another dispersion solution between the immersing of capacitor element 2 in the first dispersion solution and the immersing of capacitor element 2 in the second dispersion solution.

Then, capacitor element 2 is accommodated in the case. At this moment, capacitor element 2 may be first impregnated with the electrolyte solution and then, accommodated in the case, or alternatively, capacitor element 2 may be first accommodated in the case, and then, the case may be filled with the electrolyte solution. Tip ends of anode terminal 3 and cathode terminal 4 pass through sealing member 6 so that sealing member 6 seals the opening of case 5.

The above processes provide electrolytic capacitor 1 according to the embodiment.

The first dispersion solution is almost neutral and thus causes very little damage to dielectric films 12 and 112. Thus, electrolytic capacitor 1 has a small leakage current.

The second dispersion solution is more highly acidic or basic than the first dispersion solution. Thus, second conductive polymer layers 13B and 113B can be efficiently formed between dielectric film 12 and separators 9 and 10.

Conductive polymer layers 13 and 113 formed by the immersion in dispersion solution can be more uniformly formed with a smaller thickness than by chemical polymerization or electropolymerization. Thus, capacitor element 2 can have a smaller size. The amount of required conductive polymer can be used, thus reducing a material cost.

EXAMPLE 1

For Example 1, the following first dispersion solution is used to form first conductive polymer layers 13A and 113A, and the second dispersion solution is used to form second conductive polymer layers 13B and 113B.

Separators 9 and 10 are mainly made of cellulose.

The first dispersion solution and the second dispersion solution consist of common mother liquid having an adjusted pH, respectively. The mother liquid includes water as solvent.

A method of manufacturing the mother liquid will be described below. First, 3,4ethylenedioxythiophene which is a monomer of conductive polymer is mixed with dopant molecules, such as polystyrene sulfonate, thereby providing monomer solution. Oxidizing agent solution made of ammonium persulfate or ferric sulfate is prepared in another container.

Next, the oxidizing agent solution is mixed with the monomer solution while agitating the monomer solution to polymerize monomer, thereby providing polymerization liquid.

Then, impurities are removed from this polymerization liquid by centrifugation, filtering, or ion exchange for example, thereby preparing conductive polymer solution including poly(3,4ethylenedioxythiophene).

Then, this solution is dispersed and agitated with, e.g. a jet mill under a high pressure ranging from 100 to 200 MPa, thereby resulting in the mother liquid.

The mother liquid is solution having doped conductive polymer particles dispersed in the solvent. The conductive polymer particles can have a small diameter by increasing the rotation rate during agitation or by a long-time agitation. The mother liquid has an electric conductivity of 200 S/cm and the conductive polymer has a concentration of 2.0 wt %.

In Example 1, since the mother liquid is acidic having a pH value of 4, the mother liquid is used as the second dispersion solution. The mother liquid may have basic substance of a compound, such as ammonia or amine, added thereto, or may be diluted by solvent, or may have anion removed therefrom, thereby causing the first dispersion solution to have a pH value to be closer to 7 than the second dispersion solution to have the pH value range from 6 to 8. In Comparative Example 1, the second dispersion solution has a pH value of 7. The first dispersion solution preferably has a pH value ranging from 6 to 8 while the second dispersion solution preferably has, when being acidic, a pH value ranging from 4 to 6.5.

For Example 1, the mother liquid includes oxidizing agent and tends to be acidic. Thus, the mother liquid is directly used as the second dispersion solution. The mother liquid having an adjusted pH value is used as the first dispersion solution.

Figure 3:
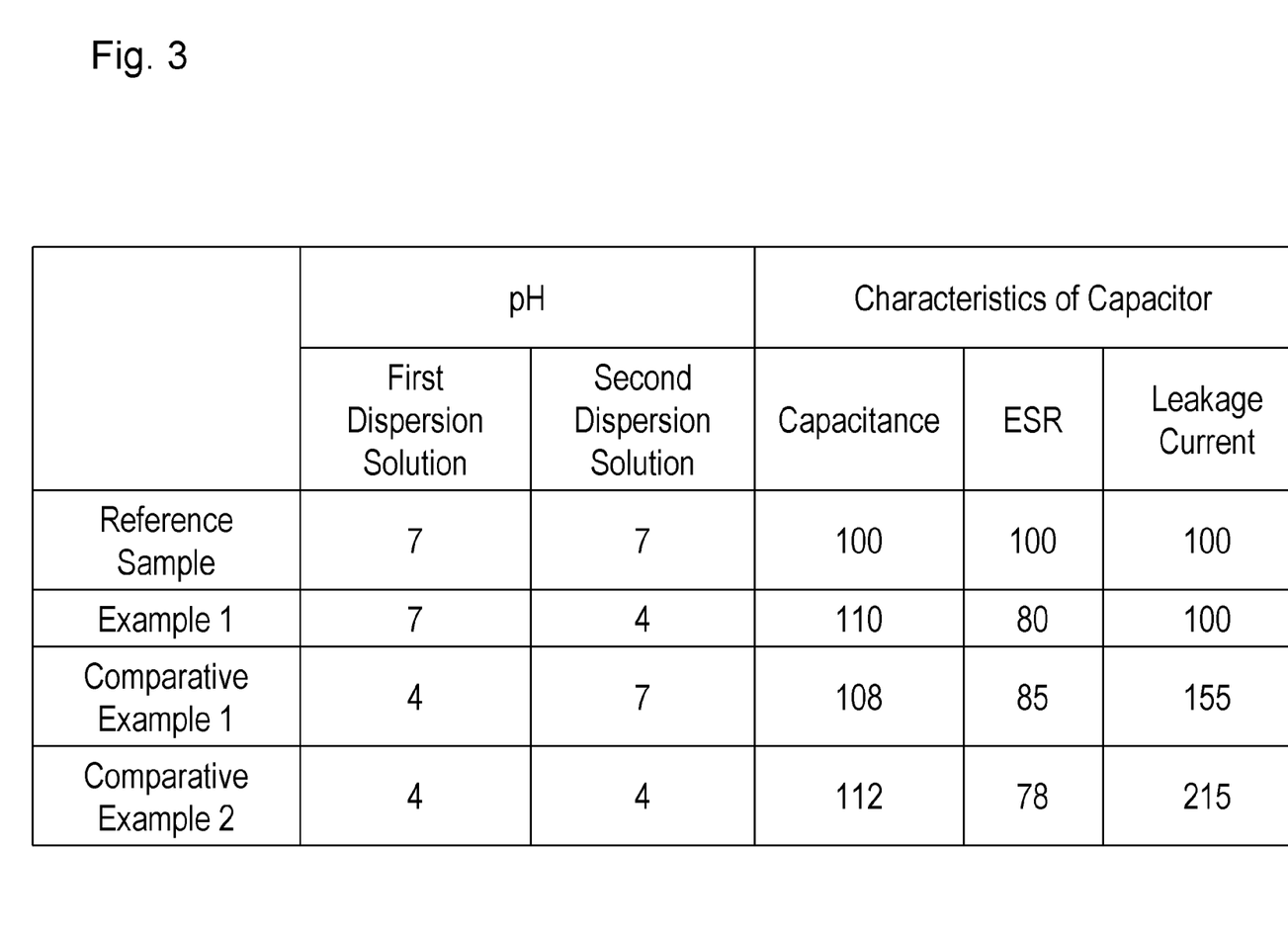
FIG. 3 illustrates the relation between a pH value of the dispersion solution and the capacitor characteristic.

FIG. 3 shows comparison between the first dispersion solution and the second dispersion solution in the pH value, a capacitance, an equivalent series resistance (ESR), and a leakage current. The capacitance was measured by an impedance analyzer at 120 Hz and 20° C. The ESR was measured by the impedance analyzer at 100 kHz and 20° C. The leakage current was measured after applying a rated voltage for two minutes.

FIG. 3 further shows the comparison of Example 1, Comparative Example 1, and Comparative Example 2 in the capacitance, the ESR, and the leakage current of a reference sample are 100. The reference sample was prepared with the first dispersion solution and the second dispersion solution both having a pH value of 7. As Comparative Example 1, the first dispersion solution had a pH value of 4 while the second dispersion solution had a pH value of 7. As Comparative Example 2, the first and second dispersion solutions both had a pH value of 4.

As shown in FIG. 3, Example 1 has the capacitance and ESR substantially equal to those of Comparative Examples 1 and 2 and has a smaller leakage current. Compared with the reference sample, Example 1 has a larger capacitance, a smaller ESR, and a substantially-equal leakage current. Specifically, Example 1 can have a small-leakage-current characteristic while allowing electrolytic capacitor 1 to have a large capacitance and a small ESR.

For Example 1, since the first dispersion solution contacting dielectric films 12 and 112 has a pH value close to neutral, dielectric films 12 and 112 can presumably have small damage, thus reducing the leakage current.

Figure 4:
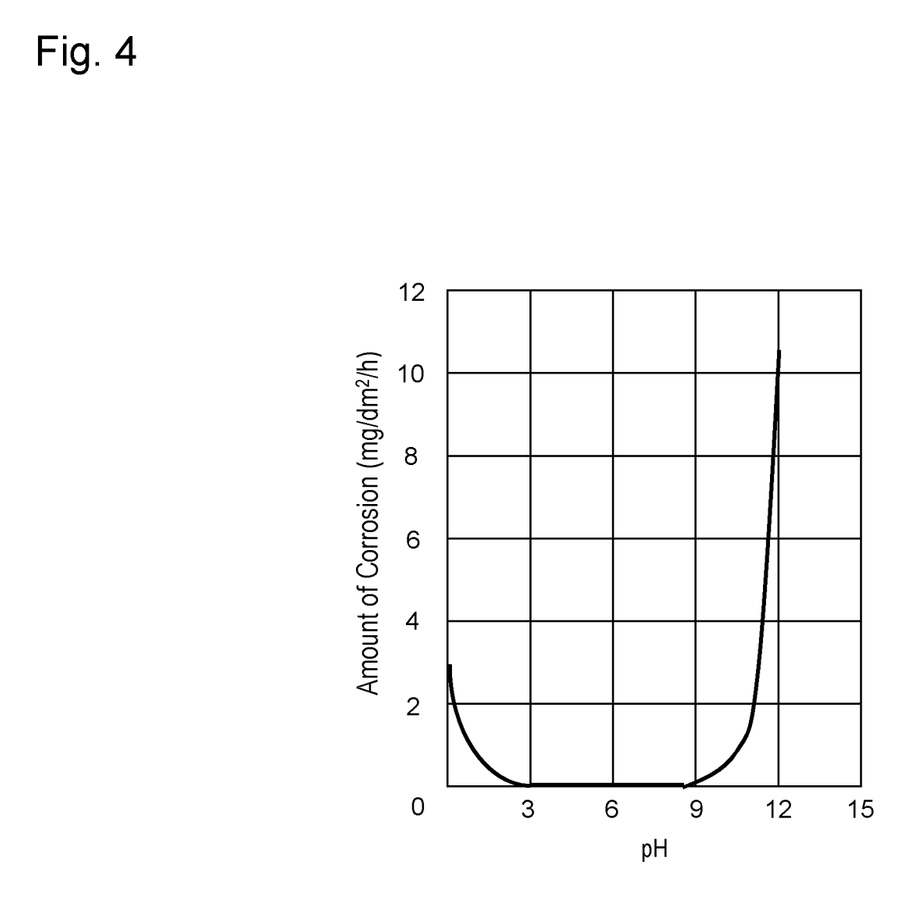
FIG. 4 illustrates the relation between aluminum solubility and the pH value.

FIG. 4 illustrates the relation between the amount of corrosion to aluminum and the pH value. As shown in FIG. 4, the amount of corrosion to aluminum is reduced is the pH value is close to neutral. This is presumably due to that the dielectric film consisting of an oxidized aluminum having a deformed crystal structure or a partially-lost dielectric film could suppress, as in aluminum, the damage in a pH value close to neutral.

Furthermore, in Example 1, the mother liquid is acidic and thus can be used as the second dispersion solution directly or without a substantial pH adjustment. Thus, the productivity can be improved and additive substance can be reduced. Furthermore, the second dispersion solution is acidic and can be efficiently retained by separators 9 and 10 made of cellulose, thus providing a small ESR and a large capacitance.

Although the mother liquid of Example 1 is acidic, even if the mother liquid is basic, the mother liquid also can be used as the second dispersion solution. The first dispersion solution having a pH value close to 7 can be formed by further adding acidic substance to the mother liquid or diluting the mother liquid with solvent or by removing cation therefrom. The acidic substance can be a compound, such as sulfuric acid or carboxylic acid. In the case that the second dispersion solution is basic, the second dispersion solution preferably has a pH value ranging from 7.5 to 10.

In the case that the mother liquid is substantially neutral, the mother liquid can be used as the first dispersion solution. When the mother liquid is added with acidic substance or basic substance, the mother liquid can be used as the second dispersion solution.

EXAMPLE 2

For Example 2, in addition to the conditions in Example 1, the first conductive polymer particles have diameters smaller than a mode of diameters of the second conductive polymer particles.

The mode of the diameters of the conductive polymer particles is defined as a particle size distribution peak measured by a dynamic light scattering technique. Specifically, the mode of the diameters of the particles is a so-called mode diameter. In Example 2, the particle size distribution was measured by the Zeta-Sizer Nano, a dynamic light scattering particle size distribution meter made by Malvern Instruments.

The mode of the diameters of the first conductive polymer particles ranges, e.g. from 10 nm to 100 nm. The mode of the diameters of the first conductive polymer particles of Example 2 is about 20 nm.

The mode of the diameters of the second conductive polymer particles ranges, e.g. from 50 nm to 250 nm. The mode of the diameters of the second conductive polymer particles of Example 2 is about 70 nm. The diameters of the second conductive polymer particles are larger than the mode of the diameters of the first conductive polymer particles.

The diameters of the conductive polymer particles can be adjusted by changing the number of times of the agitation or the agitation rate of the dispersion solution or by adding dispersant to the dispersion solution.

The mode of diameters of pits 11 is larger than the mode of the diameters of the first conductive polymer particles and the mode of the diameters of the second conductive polymer particles. The second conductive polymer particles can fill pits 11, thus reducing the ESR.

Capacitor element 2 is preferably immersed in the second dispersion solution for a longer time than in the first dispersion solution. The reason is that the second conductive polymer included in the second dispersion solution is made of such particles that have a large diameter and that can hardly enter in spaces. Since capacitor element 2 is first immersed in the first dispersion solution, spaces are filled with the first conductive polymer particles, and thus are narrowed. Also due to this reason, capacitor element 2 is preferably immersed in the second dispersion solution for a longer time than in the first dispersion solution.

For Example 2, two types of dispersion solutions were used. However, three or more types of dispersion solutions may be used. In this case, any of the dispersion solutions preferably includes conductive polymer particles having a mode of diameters thereof that is smaller than a mode d of the diameters of pits 11 in anode foil 7. Even large particles can improve, when entering in pits 11, the conductive polymer filling rate, thus providing a small ESR and a large capacitance. The spaces in pits 11 are reduced, thus improving the thermal stability of capacitor element 2.

EXAMPLE 3

For Example 3, in addition to the conditions applied in Example 1, the first dispersion solution has a viscosity lower than the second dispersion solution.

The first dispersion solution was retained at a temperature ranging from 30° C. to 40° C. Capacitor element 2 is immersed in the first dispersion solution having a viscosity which is, e.g. not lower than 20 mPa·s and is lower than 45 mPa·s.

The second dispersion solution is retained at a temperature ranging from 15° C. to 25° C. Capacitor element 2 is immersed in the second dispersion solution having a viscosity which is, e.g. not lower than 45 mPa·s and is not higher than 70 mPa·s.

The first dispersion solution having a lower viscosity can more easily enter in pits 11, thus providing electrolytic capacitor 1 with improved ESR characteristic and capacitance characteristic. Furthermore, the second dispersion solution having a higher viscosity can allow the gap between anode foil 7 and cathode foil 8 to be efficiently filled with conductive polymer layers 13 and 113. The dispersion solution can have a lower viscosity by, in addition to the use of the temperature, increasing the agitation rate or increasing the agitation time to apply a shearing stress.

The first conductive polymer particles and the second conductive polymer particles may have the same mode of the diameters thereof. Alternatively, the first conductive polymer particles may have a smaller mode of diameters thereof than the second conductive polymer particles.

EXAMPLE 4

For Example 4, in addition to the conditions applied in Example 1, the first conductive polymer in the first dispersion solution has a weight concentration lower than that of the second conductive polymer in the second dispersion solution.

The first conductive polymer and the second conductive polymer are poly(3,4ethylenedioxythiophene) having polystyrene sulfonate doped therein.

The first dispersion solution of Example 4 includes the first conductive polymer at a weight concentration ranging, e.g. from 1.0 wt % to 2.0 wt %. The second dispersion solution includes the first conductive polymer at a weight concentration ranging, e.g. from 2.0 wt % to 3.0 wt %.

The first dispersion solution and the second dispersion solution can be prepared by diluting or condensing the mother liquid of Example 1 with solvent to adjust the weight concentration.

For Example 4, the first dispersion solution includes the first conductive polymer at a lower weight concentration. Thus, the first dispersion solution has a lower viscosity and thus can easily fill pits 11.

For Example 4, a mode of diameters of the first conductive polymer particles may be smaller than a mode of diameters of the second conductive polymer particles. Alternatively, the first dispersion solution may have a viscosity lower than the viscosity of the second dispersion solution. Alternatively, the mode of the diameters of the first conductive polymer particles may be smaller than the mode of the diameters of the second conductive polymer particles and the first dispersion solution may have a viscosity lower than the viscosity of the second dispersion solution.

INDUSTRIAL APPLICABILITY

An electrolytic capacitor according to the present invention has a small leakage current and is useful an electrolytic capacitor with a high withstanding voltage.

REFERENCE MARKS IN THE DRAWINGS

1 Electrolytic Capacitor
2 Capacitor Element
3 Anode Terminal
4 Cathode Terminal
5 Case
6 Sealing Member
7 Anode Foil
7A Surface
7B Surface
8 Cathode Foil
9 Separator
10 Separator
11 Pit
12 Dielectric Film
112 Dielectric Film
13 Conductive Polymer Layer
113 Conductive Polymer Layer
13A First Conductive Polymer Layer
113A First Conductive Polymer Layer
13B Second Conductive Polymer Layer
113B Second Conductive Polymer Layer

The invention claimed is:

1. A method of manufacturing an electrolytic capacitor, said method comprising:
   preparing an anode including a dielectric film provided at a surface thereof;
   impregnating the anode with a first dispersion solution including first conductive polymer particles and a first solvent; and
   after said impregnating the anode with the first dispersion solution, impregnating the anode with a second dispersion solution including second conductive polymer particles and a second solvent,
   wherein:
   a pH value of the first dispersion solution is closer to 7 than a pH value of the second dispersion solution and is larger than the pH value of the second dispersion solution,
   the first dispersion solution and the second dispersion solution are respectively made by adjusting a pH value of a common mother liquid containing conductive polymer particles and a solvent, and
   during said impregnating the anode with the first dispersion solution, the first dispersion solution contacts the dielectric film.

2. The method of claim 1, wherein a mode of diameters of the first conductive polymer particles is smaller than a mode of diameters of the second conductive polymer particles.

3. The method of claim 2, wherein the surface of the anode at which the dielectric film is provided has a plurality of pits formed therein, and wherein a mode of diameters of the second conductive polymer particles is smaller than a mode of diameters of the plurality of the pits.

4. The method of claim 1, wherein a weight concentration of the first conductive polymer particles in the first dispersion solution is lower than a weight concentration of the second conductive polymer particles in the second dispersion solution.

5. The method of claim 1, wherein the first dispersion solution has a lower viscosity than the second dispersion solution.

6. The method of claim 1, wherein the first dispersion solution has a pH value of 6 to 8, and the second dispersion solution has a pH value of 4 to 6.5.

7. The method of claim 1, wherein said impregnating the anode with the first dispersion solution is performed so as to cause formation of a first conductive polymer layer on the dielectric film.

8. The method of claim 7, wherein said impregnating the anode with the second dispersion solution is performed so as to cause formation of a second conductive polymer layer on the first conductive polymer layer.

9. The method of claim 8, wherein a mode of diameters of the first conductive polymer particles is equal to a mode of diameters of the second conductive polymer particles.

10. The method of claim 1, wherein the pH value of the first dispersion solution or the pH value of the second dispersion solution is adjusted by adding a basic substance of a compound to the common mother liquid.

11. The method of claim 1, wherein the pH value of the first dispersion solution or the pH value of the second dispersion solution is adjusted by diluting the common mother liquid.

12. The method of claim 1, wherein the pH value of the first dispersion solution or the pH value of the second dispersion solution is adjusted by removing an anion from the common mother liquid.

13. The method of claim 1, wherein a mode of diameters of the first conductive polymer particles is equal to a mode of diameters of the second conductive polymer particles.

* * * * *